United States Patent
Ling et al.

(10) Patent No.: US 11,027,349 B2
(45) Date of Patent: Jun. 8, 2021

(54) POWER TOOL

(71) Applicant: Nanjing Chervon Industry Co., Ltd., Nanjing (CN)

(72) Inventors: Qi Ling, Nanjing (CN); Rong Wang, Nanjing (CN); Yang Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/112,530

(22) Filed: Dec. 4, 2020

(65) Prior Publication Data

US 2021/0086276 A1  Mar. 25, 2021

Related U.S. Application Data

(63) Continuation of application No. PCT/CN2019/089844, filed on Jun. 3, 2019.

(30) Foreign Application Priority Data

Jun. 5, 2018  (CN) .......................... 201810566644.5
Nov. 29, 2018  (CN) .......................... 201811442212.X (51) Int. Cl.
  *B23D 61/00*  (2006.01)
  *B24B 23/04*  (2006.01)
  *B26D 1/00*  (2006.01)

(52) U.S. Cl.
  CPC ............ *B23D 61/006* (2013.01); *B24B 23/04* (2013.01); *B26D 2001/004* (2013.01); *B26D 2001/006* (2013.01)

(58) Field of Classification Search
  CPC .......... B25F 5/006; B25F 5/02; B23D 61/006; B24B 23/04; B26D 2001/006; B26D 2001/004
  See application file for complete search history.

(56) References Cited

U.S. PATENT DOCUMENTS

| | | | |
|---|---|---|---|
| 10,894,312 B2 * | 1/2021 | Blum | ...................... B24B 23/04 |
| 2010/0186980 A1 * | 7/2010 | Heilig | ...................... B25F 5/006 173/217 |

(Continued)

FOREIGN PATENT DOCUMENTS

| CN | 1807027 A | 7/2006 |
|---|---|---|
| CN | 201685237 U | 12/2010 |

(Continued)

OTHER PUBLICATIONS

ISA/CN, Int. Search Report issued on PCT application No. PCT/CN2019/089844, dated Sep. 6, 2019, 3 pages.

*Primary Examiner* — Jonathan G Riley
(74) *Attorney, Agent, or Firm* — Greenberg Traurig, LLP (57) ABSTRACT

A power tool includes: a power assembly including a motor, the motor including a motor shaft rotatable about a motor axis; an output assembly including an output shaft; a transmission assembly; a first housing; a second housing; wherein the power tool is provided with a first vibration isolation plane and a second vibration isolation plane; the first vibration isolation plane is provided with a first vibration isolation block, and the second vibration isolation plane is provided with a second vibration isolation block; the whole composed of the first vibration isolation block and the second vibration isolation block is at least provided with a spacing portion between the first housing and the second housing; the second housing is spaced apart from the first housing at the spacing portion; the first vibration isolation block and the second vibration isolation block are separated from each other.

12 Claims, 6 Drawing Sheets

(56) References Cited

U.S. PATENT DOCUMENTS

| | | | | |
|---|---|---|---|---|
| 2011/0067894 A1* | 3/2011 | Bernardi | ................. | B25F 5/006 |
| | | | | 173/1 |
| 2013/0269963 A1* | 10/2013 | Fuchs | ..................... | B25F 5/006 |
| | | | | 173/162.1 |
| 2014/0144662 A1* | 5/2014 | Zhou | ........................ | B25F 5/00 |
| | | | | 173/213 |
| 2014/0182872 A1* | 7/2014 | Rubens | ..................... | B26B 7/00 |
| | | | | 173/213 |
| 2015/0034353 A1* | 2/2015 | Huo | ....................... | H02K 7/145 |
| | | | | 173/217 |
| 2015/0075830 A1* | 3/2015 | Zhang | .................. | B24B 23/022 |
| | | | | 173/213 |
| 2016/0221175 A1* | 8/2016 | Aoki | ...................... | B24B 23/04 |
| 2017/0110946 A1 | 4/2017 | Oktavec et al. | | |
| 2017/0136599 A1* | 5/2017 | Aoki | ...................... | B24B 23/04 |
| 2017/0151658 A1* | 6/2017 | Luescher | ................ | F16H 25/16 |
| 2017/0225316 A1* | 8/2017 | Iwakami | ................ | B25F 5/006 |
| 2018/0029215 A1* | 2/2018 | Zhong | .................... | B25F 5/006 |
| 2018/0111244 A1* | 4/2018 | Blickle | ................. | H02K 7/145 |
| 2020/0163680 A1* | 5/2020 | Schaz | ................... | A61B 17/142 |
| 2020/0164450 A1* | 5/2020 | Li | ........................ | B23D 61/006 |
| 2020/0180133 A1* | 6/2020 | Chan | ..................... | B27B 19/006 |
| 2020/0282539 A1* | 9/2020 | Ikuta | ........................ | B25F 5/02 |
| 2020/0316767 A1* | 10/2020 | Furusawa | ............... | B24B 47/10 |

FOREIGN PATENT DOCUMENTS

| | | | |
|---|---|---|---|
| CN | 104114332 A | 10/2014 | |
| CN | 105710440 A | 6/2016 | |
| CN | 205766001 U | 12/2016 | |
| EP | 2777847 A1 | 9/2014 | |

\* cited by examiner

POWER TOOL

RELATED APPLICATION INFORMATION

The present application is a continuation of International Application Number PCT/CN2019/089844, filed on Jun. 3, 2019, through which this application also claims the benefit of Chinese Patent Application No. CN 201810566644.5, filed on Jun. 5, 2018, and also the benefit of Chinese Patent Application No. 201811442212.X, filed on Nov. 29, 2018, which applications are incorporated herein by reference in their entirety.

TECHNICAL FIELD

The present disclosure relates to a power tool, for example, an oscillating tool.

BACKGROUND

Power tools such as electric hammers, reciprocating saws, oscillating tools, etc. generate vibration during operation, which affects the results of processing a workpiece. Also, when a user is holding a hand-held power tool of this type for work, the vibration generated by the tool itself will be transmitted to the user through hands, such that the user cannot hold the tool stably, and will feel tired after working for some time. Especially, an oscillating tool, which includes an eccentric transmission assembly to generate oscillation, will generate a large vibration after being turned on. On the one hand, this makes the user unable to hold the oscillating tool stably, thereby affecting the processed results of sawn workpiece; on the other hand, the user will feel very tired after using the tool for some time, thereby affecting work efficiency.

SUMMARY

Described is a power tool including: a power assembly including a motor, the motor including a motor shaft rotatable about a motor axis; an output assembly including an output shaft configured to output power; a transmission assembly configured to realize power transmission between the power assembly and the output assembly; a first housing supporting at least the power assembly, the transmission assembly and the output assembly; a second housing surrounding at least part of the first housing, the second housing being further formed with a handle portion configured for a user to hold; wherein the power tool is provided with a first vibration isolation plane and a second vibration isolation plane; the first vibration isolation plane is provided with a first vibration isolation block, and the second vibration isolation plane is provided with a second vibration isolation block; a whole composed of the first vibration isolation block and the second vibration isolation block is at least provided with a spacing portion provided between the first housing and the second housing, and the second housing is spaced apart from the first housing at the spacing portion; the first vibration isolation block and the second vibration isolation block are separated from each other.

DETAILED DESCRIPTION

Figure 1:
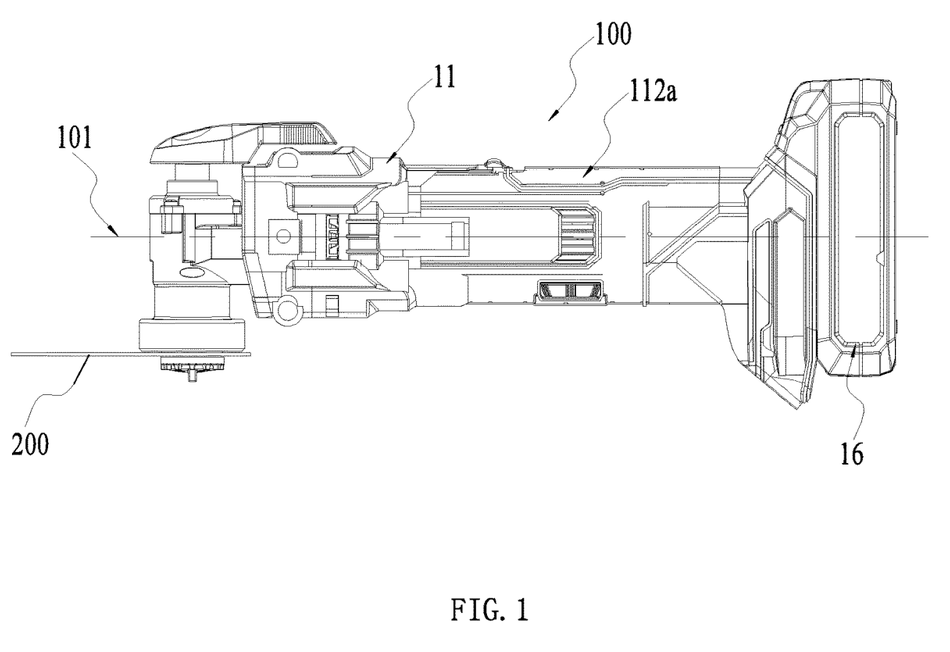
FIG. 1 is a plan view of a power tool with a work attachment installed, according to a first example.

As shown in FIG. 1, the present disclosure proposes a power tool 100. The power tool 100 may be a power tool that is powered by electric energy. The power tool 100 may be a hand-held power tool. More specifically, the power tool 100 may be an oscillating tool. As shown in FIG. 1, in an example, the power tool 100 may be an oscillating tool, this kind of oscillating tool can couple with a variety of work attachments 200, such as a triangular sand, a blade, a metal saw, a wood saw, an emery saw blade, etc., and through these different work attachments 200, the power tool 100 can realize functions like sawing, sanding, filing, and shovelling. It can be understood that the power tool 100 can also be other power tools that generate relatively large vibration during the working process, such as an electric drill, an electric hammer, a reciprocating saw, a sander; as an option, the power tool 100 of the present example includes a body and a workhead provided at a front end, wherein the main source of vibration is generated by the workhead, and the user is holding the body, such that the power tool 100 of the present disclosure will produce a better damping effect.

The specific structure and principle of the power tool 100 are described in detail below.

Figure 2:
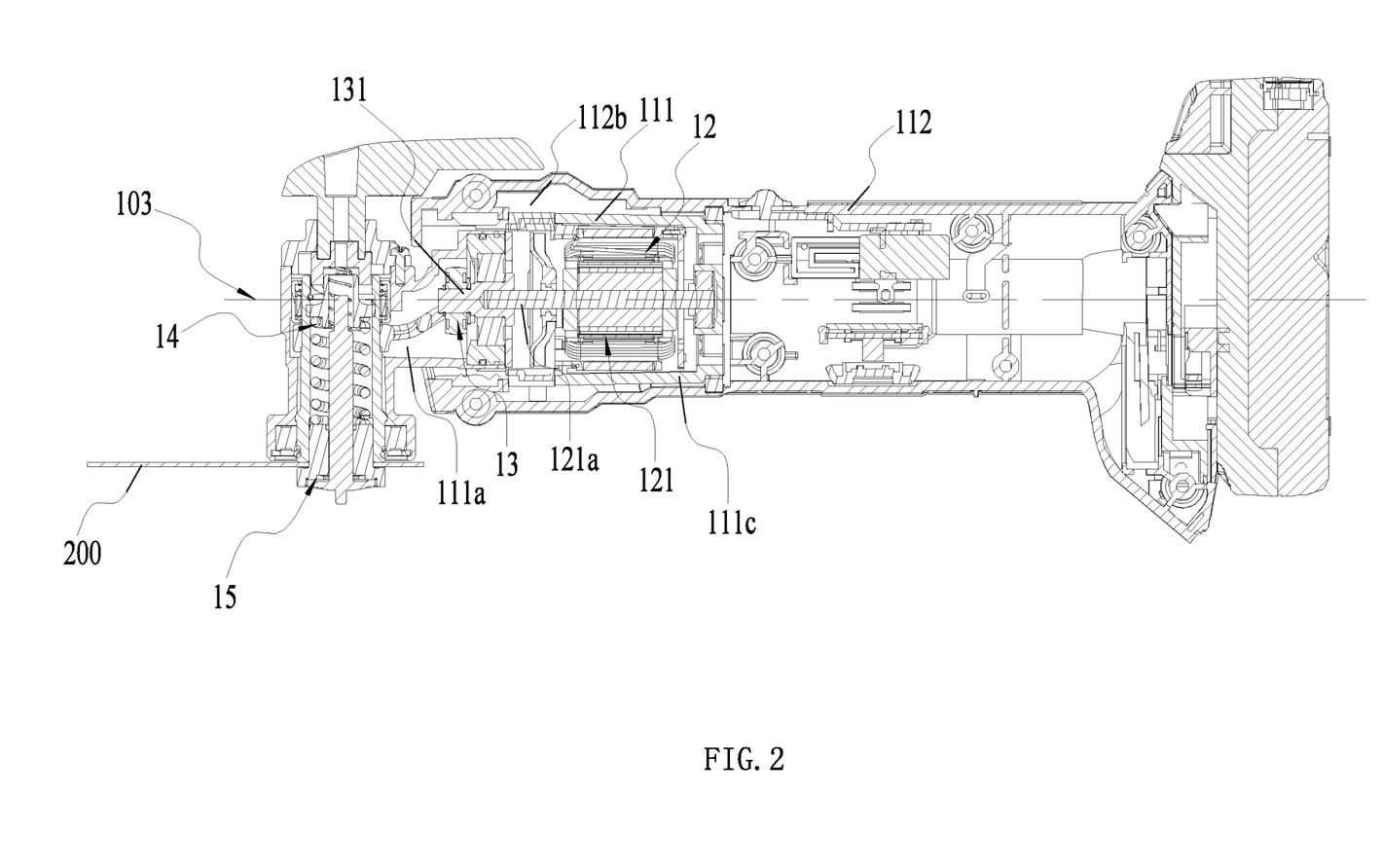
FIG. 2 is a cross-sectional view of the power tool in FIG. 1 with the work attachment installed.
Figure 3:
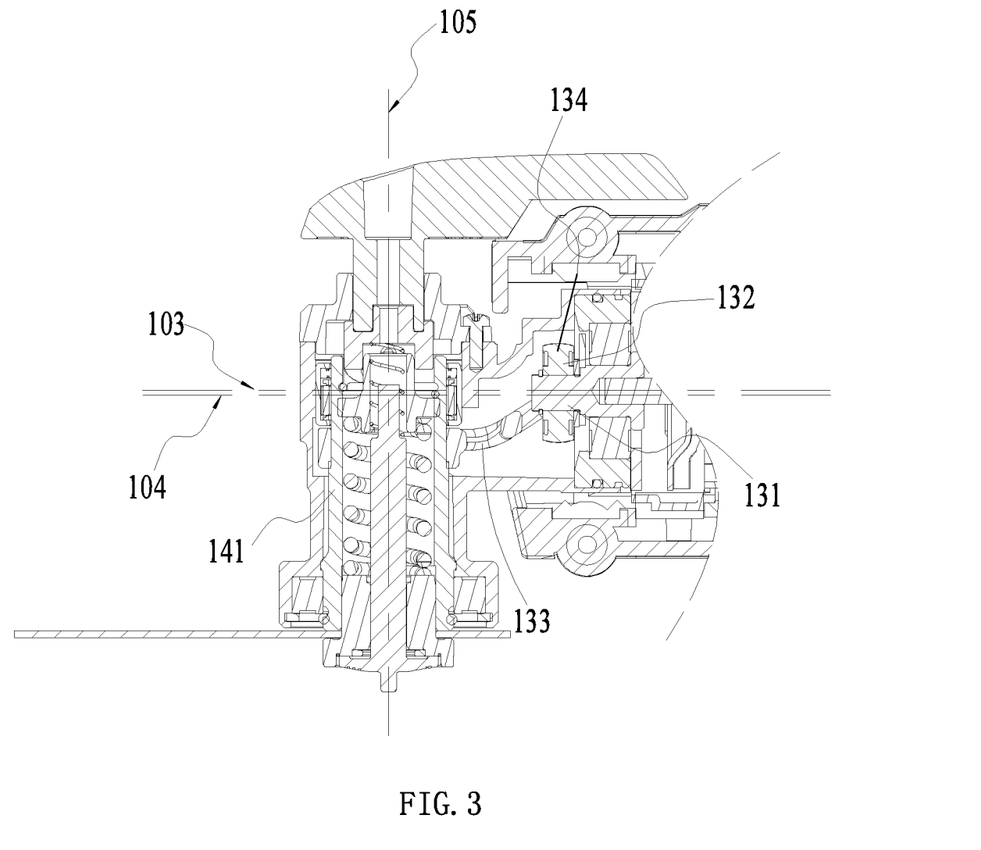
FIG. 3 is an enlarged view of part of the structure in FIG. 2.

Referring to FIGS. 1 and 2, the power tool 100 is a hand-held power tool, in the present example, the power tool 100 is a hand-held oscillating tool. Specifically, the power tool 100 includes: a housing assembly 11, a power assembly 12, a transmission assembly, an output assembly 14, a clamping device 15 and a power source. Wherein, the housing assembly 11 forms the outline of the power tool 100, the power assembly 12 includes a prime mover configured to provide driving force, and the prime mover is arranged inside the housing assembly 11. In this example, for oscillating tools, the transmission assembly is an eccentric transmission assembly 13 that can provide oscillating motion. The clamping device 15 is operable to install the work attachment 200 to the power tool 100, and the clamping device 15 can also be regarded as a part of the output assembly 14. In this example, the power source is a battery pack 16. In other examples, the power source may also be an external AC power cord. Therefore, in this example, the power tool 100 is taking an electric tool as an example.

The housing assembly 11 includes a first housing 111 and a second housing 112. The first housing 111 is at least partially disposed in the second housing 112, and the second housing 112 is formed with a handle 112*a* for the user to hold. At least part of the second housing 112 extends along the direction of a first straight line 101. The first housing 111 is formed with an accommodating cavity 111*a* configured to accommodate and support the power assembly 12, the eccentric transmission assembly 13, and the output assembly 14. The first housing 111 further includes: a head housing 111*b* and a power housing 111*c*, wherein the head housing 111*b* is configured to at least partially cover the output assembly 14, and the power housing 111*c* is configured to at least partially cover the power assembly 12. In fact, the part of the housing assembly 11 arranged in the second housing 112 may also be regarded as the first housing 111, and a gap 112b is formed between the first housing 111 and the second housing 112, at least in a direction perpendicular to the first straight line 101. The second housing 112 may specifically include a left housing 112c and a right housing 112d. The left housing 112c and the right housing 112d may be substantially symmetrically arranged about a mid-plane 102, such that a handle portion 112a formed by the left housing 112c and the right housing 112d is also substantially symmetrically arranged about the mid-plane 102, and the first housing 111 may also be substantially symmetrical about the mid-plane 102. The power assembly 12, the eccentric transmission assembly 13, the output assembly 14, and the clamping device 15 arranged in the first housing 111 or the second housing 112 are also substantially symmetrically arranged about the mid-plane 102.

The power assembly 12 includes: a prime mover configured to provide power to the output assembly 14. The prime mover may specifically be a motor 121. The motor 121 includes a motor shaft 121a, and the motor 121 is at least partially disposed in the power housing 111c, wherein the motor shaft 121a may extend out of the power housing 111c. At this time, the motor 121 can still considered to be arranged inside the power housing 111c, and the power housing 111c can also be considered as a part of the motor 121. That is, the power housing 111c may be regarded as a housing arranged outside the motor 121 to wrap the motor 121, and the power housing 111 may also be regarded as the motor 121 housing itself. As shown in FIGS. 2-5, in some examples, the power housing 111c includes a motor housing portion 111d and an air baffle portion 111e. In the direction along the first straight line 101, the air baffle portion 111e is provided between the motor housing portion 111d and the head housing 111b, and the air baffle portion 111e connects the motor housing portion 111d and the head housing 111b, so that the motor housing portion 111d, the air baffle portion 111e, and the head housing 111b constitute the first housing 111 as a whole. In fact, the housing part that can directly receive the vibration transmitted by the eccentric transmission assembly 13 can be regarded as the first housing 111; or, the housing part that receives the vibration transmitted by the output assembly can also be regarded as the first housing 111; or, the housing of the workhead can be regarded as the first housing 111. In summary, the housing that can receive the vibration generated by the vibration source in the power tool 100 can be regarded as the first housing 111. The first housing 111 supports and contacts the vibration source. The housing that covers at least part of the first housing 111 is regarded as the second housing 112.

The motor shaft 121a can rotate relative to the housing assembly 11 about a motor axis 103. In this example, the motor axis 103 and the first straight line 101 can be considered to coincide with each other. The motor shaft 121a is formed or connected with an eccentric portion 131 at one end close to the output assembly 14 in the extension direction. The eccentric portion 131 can be regarded as a part of the eccentric transmission assembly 13. The eccentric portion 131 has a central axis 104; the central axis 104 of the eccentric portion 131 is parallel to the motor axis 103, and the distance between the central axis 104 and the motor axis 103 is the eccentricity. It is understood that when the eccentricity increases, the vibration generated by the power tool 100 will increase accordingly. The eccentric transmission assembly 13 further includes a bearing 132 and an oscillating rod 133. The output assembly 14 includes an output member configured to output power, and the output member is specifically an output shaft 141 enabled to oscillate about an output axis 105. The bearing 132 is mounted to the eccentric portion 131. When the eccentric portion 131 rotates with the motor shaft 121a, the bearing 132 will also rotate about the motor axis 103 under the drive of the eccentric portion 131. In this way, the bearing 132 has a partial movement of left and right reciprocating movement in the left and right direction perpendicular to the mid-plane 102. The oscillating rod 133 includes a mounting portion 133a and a plurality of oscillating claws 133b. The mounting portion 133a is fixedly connected to the output shaft 141. The number of oscillating claws 133b is two. Two oscillating claws 133b are arranged on the left and right sides of the bearing 132. Two oscillating claws 133b are also arranged on the left and right sides of the mid-plane 102. In this way, when the bearing 132 reciprocates, it will reciprocally hit the two oscillating claws 133b in the left-right direction. The mounting portion 133a and the output shaft 141 form a fixed connection. The whole formed by the mounting portion 133a and the output shaft 141 can reciprocally oscillate about the output axis 105 within an oscillating angle range. When the two oscillating claws 133b are hit by the bearing 132, the oscillating rod 133 will oscillate about the output axis 105, so that the oscillating rod 133 drives the output shaft 141 to oscillate within an oscillating angle range. It can be seen that the power assembly 12, the eccentric transmission assembly 13, and the output assembly 14 are the vibration sources of the power tool 100. In this disclosure, the power assembly 12, the eccentric transmission assembly 13 and output assembly 14 are substantially disposed inside the first housing 111; therefore, the vibration generated by the power assembly 12 will first be transmitted to the first housing 111. Since the housing assembly 11 includes separate first housing 111 and second housing 112, and the second housing 112 and the first housing 111 have a gap 112b in between, the vibration transmitted to the first housing 111 will be attenuated by a certain degree before being transmitted to the second housing 112. Further, the handle portion 112a is formed by the second housing 112; so that the vibration transmitted from the second housing 112 to the user's hand will also be attenuated by a certain degree, thereby improving the damping performance of the whole machine. Among them, the bearing 132 reciprocally hits the oscillating claw 133b in the left-right direction, and the output shaft 141 also reciprocates in a plane perpendicular to the mid-plane 102. Therefore, it can be understood that, in this example, the direction F of the excitation force of the vibration generated by the vibration source during the operation of the power tool 100 is substantially along a direction perpendicular to the mid-plane 102.

In fact, in the present disclosure, especially in terms of oscillating tools of the present example, the vibration generated by the oscillating rod 133 during oscillation is very large compared to other tools such as drills and circular saws. Therefore, simply arranging the first housing 111 and the second housing 112 at intervals cannot achieve a desired damping effect. In other words, with increasing demand from the market, on the one hand, the emergence of low-vibration power tools 100 is required to meet users' needs for low-vibration products; and on the other hand, the emergence of high-efficiency power tools 100 is also required. For the power tool 100, the increase in efficiency will inevitably increase the vibration of the power tool 100. Therefore, it is necessary to design a damping structure with a better damping effect for power tools 100 with high cutting efficiency. Especially for the oscillating tools in this example, on the one hand, we hope to increase the cutting efficiency by increasing the oscillating angle; on the other hand, when the oscillating angle increases, the oscillating tool will vibrate more severely. Accordingly, the present disclosure also proposed, based on the aforementioned housing assembly 11, a damping system 17 of a structure formed by the first housing 111 and second housing 112. It should be noted that the first housing 111 and the second housing 112 form a detachable connection, and the motor 121 may also be at least partially disposed in the second housing. Indeed, the damping system 17 of the present disclosure is also applicable to other power tools that have only one housing.

In this example, especially for the oscillating tool of this example, the vibration is mainly caused by the eccentric portion 131 driving the bearing 132 to rotate and the rotating bearing 132 reciprocally striking the oscillating claws 133b, so the whole composed of the eccentric portion 131, the bearing 132 and the oscillating claws 133b can be considered as the vibration source 134. The power assembly 12 connected with the eccentric portion 131, the output assembly 14 fixedly connected with the oscillating claws 133b, the clamping device 15 connected with the output assembly 14, and the first housing 111 configured to install the motor 121, the eccentric transmission assembly 13, the output assembly 14, and the clamping device 15 are all fixedly connected by a solid structure to directly receive the vibration generated by the vibration source 134. Such an assembly that is fixedly connected to the vibration source 134 through a physical structure and directly receives the vibration generated by the vibration source 134 can be regarded as a vibrating body 10. Alternatively, in addition to the eccentric transmission assembly 13 that generates the main vibration, the work attachment 200 that reciprocates and processes the workpiece, the output assembly 14 and the clamping device 15 that rotate about the output axis 105, and the high-speed rotating motor 121 that also generate vibration but are not the main vibration source can all be considered to be the vibrating body. That is, all the vibration sources 134 that generate vibration in the power tool 100 can be considered as the vibrating body 10; alternatively, the vibration source 134 that generates relatively large vibration in the power tool 100 can be considered as the vibrating body 10, and the structure that is fixedly connected to the vibration source 134 through a solid structure and directly receives the vibration generated by the vibration source 134 can also be selectively regarded as a part of the vibrating body 10 according to the specific situation. A gap 112b is provided between the second housing 112 and the first housing 111. The second housing 112 is not directly fixedly connected or in close contact with the vibrating body 10 through a solid structure. Therefore, the second housing 112 can be regarded as a non-vibrating body 20. The battery pack 16 connected to the second housing 112 should also be regarded as a non-vibrating body 20. It can be understood that the screws, buckles, other positioning structures and connection structures between the first housing 111 and the second housing 112 can be ignored because these are not regarded as the main physical structures for transmitting vibration.

In the present example, in order to reduce the vibration transmitted from the vibrating body 10 to the non-vibrating body 20, the vibrating body 10 and the non-vibrating body 20 is provided with the damping system 17 in between, which performs vibration isolation. For oscillating multi-tools, the power tool 100 may be equipped with different work attachments 200 during operation, and when the structure of the power tool 100 is involved, the weight, size, and specifications of the work attachments 200 vary; therefore, the working attachments 200 are not regarded as a part of the vibrating body 10. On the one hand, in terms of weight, the influence of the work attachment 200 on the vibrating body 10 can be ignored, and the movement direction of the work attachment 200 oscillating with the output shaft 141 is also consistent with the output shaft 141. Therefore, the work attachment 200 can be regarded as a part of the non-vibrating body 10 to facilitate the user to setup the structure and position of the damping system 17. On the other hand, the size of the work attachment 200 is relatively large, and it is undesired during the design that the position and structure of the damping system 17 is an uncertain factor due to the size of the work attachment 200. Therefore, from this aspect, the vibrating body 10 can also be considered as not including the work attachment 200. That is, the power tool 100 of the present disclosure may be considered in its bare state without work attachment 200, and thus the vibrating body 10 can be identified on the basis of the power tool 100 in the bare state. More specifically, in the present example, the vibrating body 10 may include: the power assembly 12, the eccentric transmission assembly 13, the output assembly 14, the clamping device 15 and the first housing 111. For other types of power tools 100, the vibrating body 10 may also be considered as the driving body that is enabled to drive the work attachment 200 and make the work attachment 200 realize the tool function. For the purpose of illustrating our solution, for oscillating tools, as the power tool 100 may couple with different work attachments 200 during operation, and the weight, size, and specification of the work attachments 200 vary when considering the structure of the power tool 100, the work attachments 200 are not regarded as part of the vibrating body 10. However, in actual designs, because the work attachment 200 is in direct contact with the workpiece during the working process, the generated vibration can be relatively large. Therefore, when designing the specific structure, position and parameters of the damping system 17, the existence of the work attachment 200 may be taken into consideration. After the damping system 17 is designed in consideration of the work attachments 200, in order for the public to clearly implement this disclosure without uncertain factors, it can be regarded that the size and structure involved in the following are measured when the work attachment 200 is not installed on the power tool 100.

The damping system 17 is at least partially arranged between the first housing 111 and the second housing 112. The first housing 111 serves as a support structure for the internal parts of the vibrating body 10, and through the damping system 17, the transmission of vibration to the support structure for the non-vibrating body 20, i.e., the second housing 112, can be reduced. In this way, when the user is holding the handle portion 112a formed by the second housing 112, the user's hand can feel a weak vibration generated by the power tool 100, so that the power tool 100 can be held more stably to improve the processing result of the power tool 100 on the workpiece. Also, it can prevent the user from feeling fatigue after using the power tool 100 for a long time.

In this example, the eccentric portion 131 drives the bearing 132 to hit the oscillating claw 133b in the left-right direction, and the output shaft 141 substantially oscillates in the left-right direction. Therefore, the eccentric transmission assembly 13 can be regarded as a vibration source; the output assembly 14 can also be regarded as a vibration source; or, the whole constituted by the two can also be regarded as a vibration source. Therefore, in this example, the direction F of the excitation force of the vibration generated by the vibration source and the motor axis 103 are perpendicular to each other. Accordingly, in the present example, the direction F of the excitation force of the vibration generated by the vibration source may be considered as the direction F of the excitation force of the vibration generated by the vibrating body 10. The direction F of the excitation force of the vibration generated by the vibrating body 10 mentioned below can be understood as the direction F of the excitation force of the vibration generated by the vibration source.

In this example, the direction F of the excitation force of the vibration generated by the vibrating body 10 is perpendicular to the mid-plane 102, so the damping system 17 may be configured to isolate vibration in a plane parallel to the direction F of the excitation force of the vibration and perpendicular to the mid-plane 102, thereby effectively reducing the vibration from the vibrating body 10 to the non-vibrating body 20 transmitted along the direction F of the excitation force of the vibration. In other words, the damping system 17 is at least partially disposed between the first housing 111 and the second housing 112 along the direction F of the excitation force, or in other words, the damping system 17 at least partially sets the first housing 111 and the second housing 112 apart in the direction F of the excitation force.

In some examples, the vibrating body 10 is provided with at least two planes perpendicular to the motor axis 103 of the motor shaft 121a: a first plane and a second plane. The damping system 17 includes: at least one first vibration isolation block 173 arranged on the first plane and at least one second vibration isolation block 174 arranged on the second plane, wherein the first plane may be defined as the first vibration isolation plane 171, and the second plane may be defined as the second vibration isolation plane 172. In this example, the first vibration isolation block 173 and the second vibration isolation block 174 constitute at least a spacing portion 17a provided between the first housing 111 and the second housing 112, and the second housing 112 is spaced apart from the first housing 111 at the spacing portion 17a. The first vibration isolation block 173 and the second vibration isolation block 174 are also separated from each other. In some examples, the first vibration isolation block 173 is disposed between the first housing 111 and the second housing 112, and the second vibration isolation block 174 is disposed between the first housing 111 and the second housing 112. The second housing 112 is spaced apart from the first housing 111 at the first vibration isolation block 173, and the second housing 112 is also spaced apart from the first housing 111 at the second vibration isolation block 174. The first isolation block 173 and the second isolation block 174 being separated from each other may be understood as the first isolation block 173 and the second isolation block 174 being non-integrally formed, spaced apart with a certain distance in between. In this way, by providing the first vibration isolation block 173 and the second vibration isolation block 174 in the power tool 100, the damping effect of the damping system 17 can be improved, thereby improving the work efficiency of the user. In a direction perpendicular to the first vibration isolation plane 171, the first vibration isolation block 173 and the second vibration isolation block 174 are spaced apart from each other.

The first vibration isolation plane 171 and the second vibration isolation plane 172 are also perpendicular to the mid-plane 102 of the vibrating body 10, and the first vibration isolation plane 171 and the second vibration isolation plane 172 are also parallel to the direction F of the excitation force generated by the vibrating body 10. The first vibration isolation plane 171 and the second vibration isolation plane 172 are also parallel to the output axis 105 of the output shaft 141. The output shaft 141 oscillates within a plane perpendicular to the output axis 105. Therefore, the first vibration isolation plane 171 and the second vibration isolation plane 172 are also perpendicular to the oscillating plane of the output shaft 141, and the first vibration isolation plane 171 and the second vibration isolation plane 172 are also perpendicular to the first straight line 101. In this way, the first vibration isolation block 173 on the first vibration isolation plane 171 and the second vibration isolation block 174 on the second vibration isolation plane 172 can reduce the vibration transmitted from the vibrating body 10 to the non-vibrating body 20. In this example, the direction along the first straight line 101 and from the first vibration isolation plane 171 to the second vibration isolation plane 172 is defined as backward; the direction along the first straight line 101 and from the second vibration isolation plane 172 to the first vibration isolation plane 171 is defined as forward. In other words, it is desired that the damping system 17 can reduce the vibration from the vibrating body 10 to the non-vibrating body 20 along the direction F of the excitation force, therefore, we can also set up the system as the following: first define an isolation plane perpendicular to the direction F of the excitation force; and the vibrating body 10 is provided with at least a first vibration isolation plane 171 and a second vibration isolation plane 172 that are both perpendicular to the isolation plane; then, a first vibration isolation block 173 on the first vibration isolation plane 171 and a second vibration isolation block 174 on the second vibration isolation plane 172 can cut off the vibration transmission path in the direction F of the excitation force and the direction obliquely intersecting with the direction F of the excitation force, thereby absorbing the vibration generated by the vibrating body 10, and reducing the vibration transmitted from the vibrating body 10 to the non-vibrating body 20 in the direction F of the excitation force.

Figure 4:
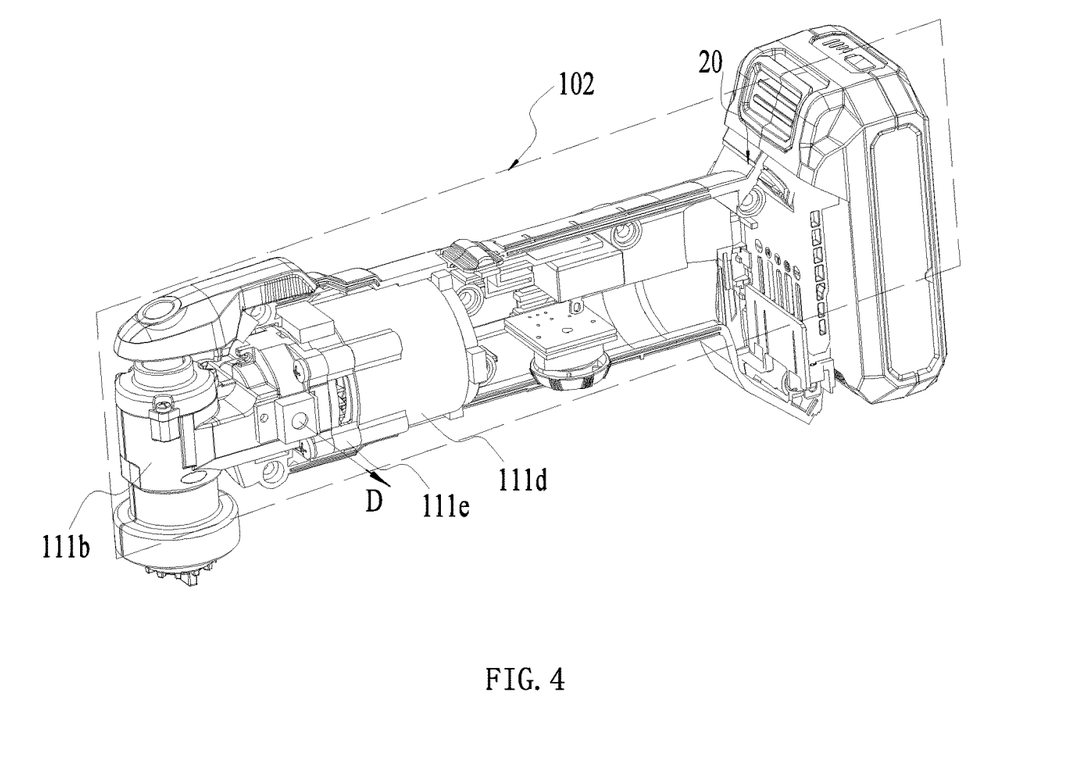
FIG. 4 is a perspective view of the power tool in FIG. 1 with a left housing removed.
Figure 5:
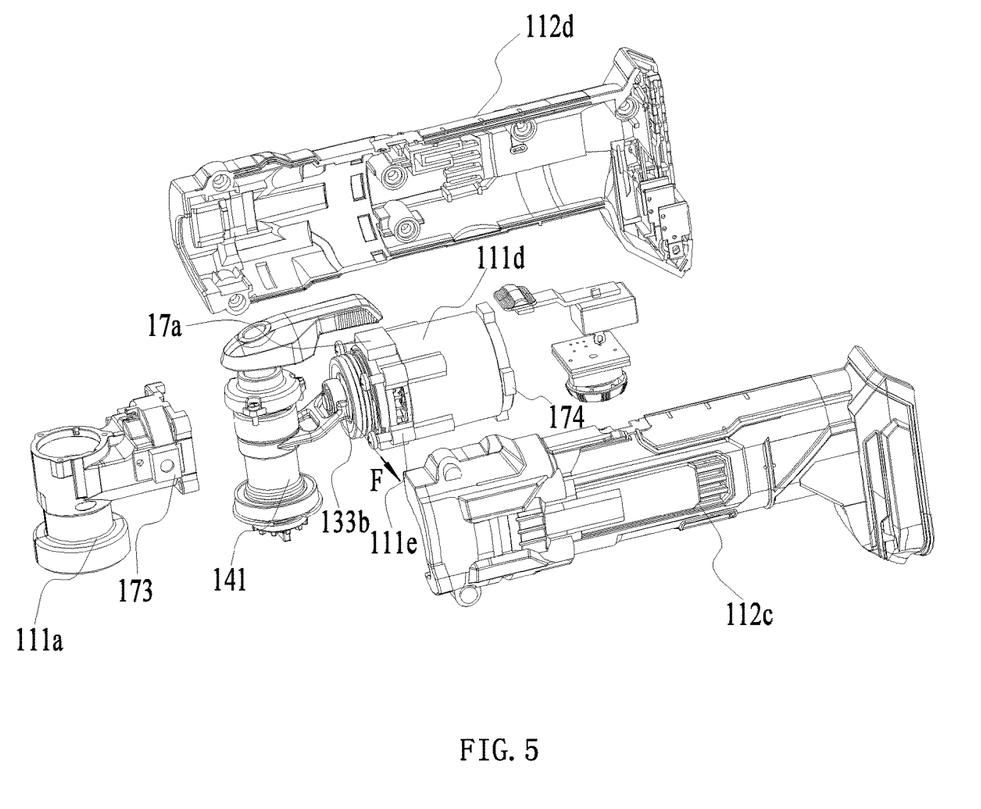
FIG. 5 is an exploded view of the power tool in FIG. 1 with a battery pack removed.
Figure 6:
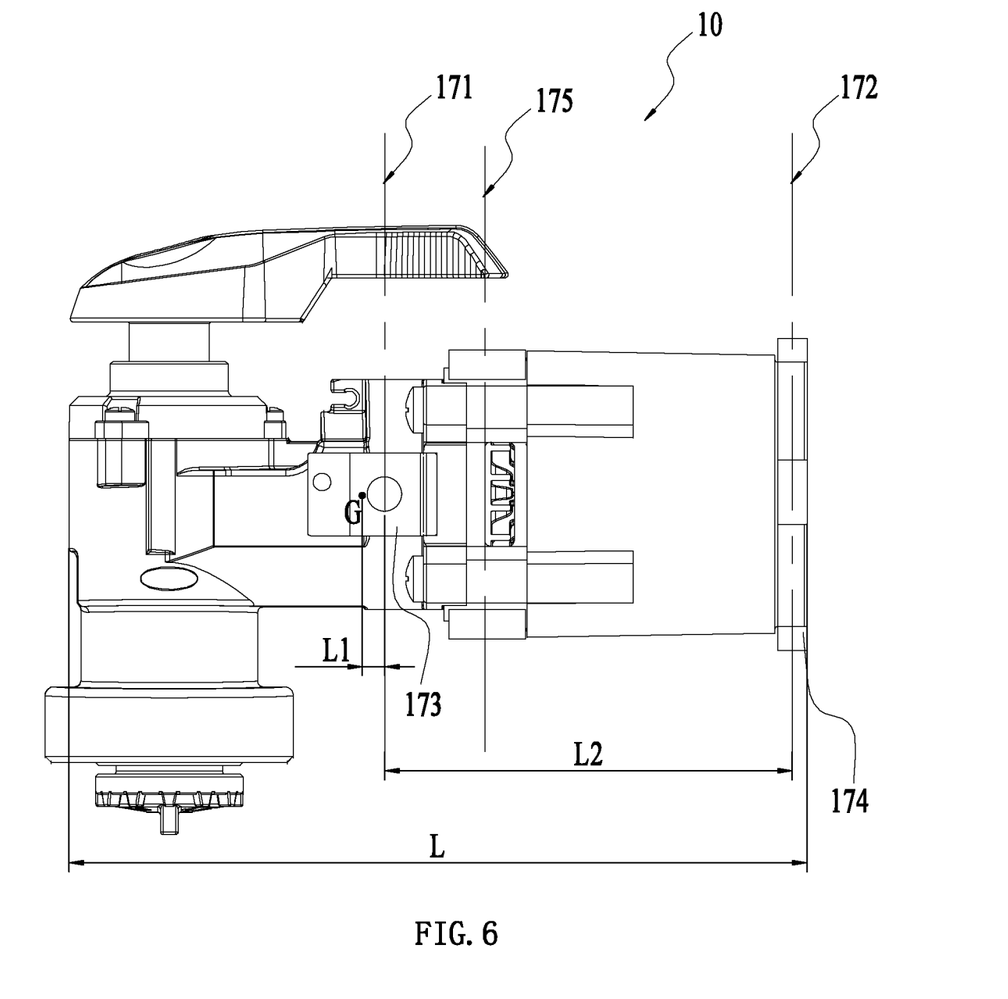
FIG. 6 is a plan view of a vibrating body of the power tool in FIG. 1.

As shown in FIGS. 4-6, in this example, the length of the vibrating body 10 along the motor axis 103 is L, that is, the length of the vibrating body 10 in the direction in which the handle 112a extends is L, in other words, the length of the vibrating body 10 along a direction perpendicular to the first vibration isolation plane 171 is L. Furthermore, since the motor 121, the eccentric transmission assembly 13, the output assembly 14, and the clamping device 15 of the vibrating body 10 are substantially arranged in the first housing 111, in this example, the length L can also be understood as the length of the first housing 111. The vibrating body 10 also has a center of gravity G. In this example, in the direction along the motor axis 103, the distance between the first vibration isolation plane 171 and the center of gravity G is L1, that is, the distance between the first vibration isolation plane 171 and the center of gravity G along the motor axis 103 is L1, in other words, the distance between the first vibration isolation plane 171 and the center of gravity G in the direction perpendicular to the first vibration isolation plane 171 is L1. In this example, the ratio of the distance L1 between the first vibration isolation plane 171 and the center of gravity G in the motor axis 103 to the length L of the vibrating body 10 in the motor axis 103 is greater than or equal to 0 and less than or equal to 0.3, that is, the ratio of the distance L1 between the first vibration isolation plane 171 and the center of gravity G in the direction perpendicular to the first vibration isolation plane 171 to the length L of the vibrating body 10 in the direction perpendicular to the first vibration isolation plane 171 is greater than or equal to 0 and less than or equal to 0.3. Wherein the ratio of the distance L1 between the first vibration isolation plane 171 and the center of gravity G in the motor axis 103 to the length L of the vibrating body 10 in the direction of the motor axis 103 being greater than or equal to 0 and less than or equal to 0.3 means that the first vibration isolation plane 171 passes through the center of gravity G or is arranged at a position within 0.3 L away from the center of gravity G in the front or rear side of the center of gravity G. In the motor axis 103, the distance between the first vibration isolation plane 171 and the second vibration isolation plane 172 is L2, that is, the distance between the first vibration isolation plane 171 and the second vibration isolation plane 172 along the motor axis 103 is L2, in other words, the distance between the first vibration isolation plane 171 and the second vibration isolation plane 172 in the direction perpendicular to the first vibration isolation plane 171 is L2. Wherein the ratio of the distance L2 between the first vibration isolation plane 171 and the second vibration isolation plane 172 along the motor axis 103 to the length L of the vibrating body 10 along the motor axis 103 is greater than or equal to 0.3 and less than or equal to 0.7, that is, the ratio of the distance L2 between the first vibration isolation plane 171 and the second vibration isolation plane 172 in the direction perpendicular to the first vibration isolation plane 171 to the length L of the vibrating body 10 in the direction perpendicular to the first vibration isolation plane 171 is greater than or equal to 0.3 and less than or equal to 0.7. In this way, the position of the second vibration isolation plane 172 may be arranged more reasonably, so that the damping effect of the damping system 17 can be improved. Finding a reasonable position for the second vibration isolation plane 172 can on the one hand improve the damping effect of the damping system 17, and on the other hand support the first housing 111 and the second housing 112 more stably.

In some examples, the first vibration isolation plane 171 is located on the front side of the center of gravity G, and the ratio of the distance L1 between the first vibration isolation plane 171 and the center of gravity G along the motor axis 103 to the length L of the vibrating body 10 along the motor axis 103 is greater than or equal to 0.2 and less than or equal to 0.3, wherein "between" in this example includes the end points; alternatively, the first vibration isolation plane 171 is located on the front side of the center of gravity G, and the ratio of the distance L1 between the first vibration isolation plane 171 and the center of gravity G along the motor axis 103 to the length L of the vibrating body 10 along the direction of the motor axis 103 is greater than or equal to 0.1 and less than or equal to 0.2, thereby improving the damping effect of the damping system 17; alternatively, the first vibration isolation plane 171 is located on the front side of the center of gravity G, and the ratio of the distance L1 between the first vibration isolation plane 171 and the center of gravity G along the motor axis 103 to the length L of the vibrating body 10 along the motor axis 103 is greater than or equal to 0.05 and less than or equal to 0.1, thereby improving the damping effect of the damping system 17; alternatively, the first vibration isolation plane 171 is located on the front side of the center of gravity G, and the ratio of the distance L1 between the first vibration isolation plane 171 and the center of gravity G along the motor axis 103 to the length L of the vibrating body 10 along the motor axis 103 is greater than or equal to 0 and less than or equal to 0.05, thereby improving the damping effect of the damping system 17; alternatively, the ratio of the distance L1 between the first vibration isolation plane 171 and the center of gravity G along the motor axis 103 to the length L of the vibrating body 10 along the motor axis 103 is greater than or equal to 0 and less than or equal to 0.1, that is, the first vibration isolation plane 171 is located between 0.1 L on the front side and 0.1 L on the back side of the center of gravity G; alternatively, the ratio of the distance L1 between the first vibration isolation plane 171 and the center of gravity G along the motor axis 103 to the length L of the vibrating body 10 along the motor axis 103 is greater than or equal to 0 and less than or equal to 0.05, that is, the first vibration isolation plane 171 is located between 0.05 L on the front side and 0.05 L on the back side of the center of gravity G, such that the first vibration isolation plane 171 is closer to the center of gravity G, thereby improving the damping effect of the damping system 17; alternatively, the first vibration isolation plane 171 is located on the rear side of the center of gravity G, and the ratio of the distance L1 between the first vibration isolation plane 171 and the center of gravity G along the direction of the motor axis 103 to the length L of the vibrating body 10 along the motor axis 103 is greater than or equal to 0 and less than or equal to 0.1, thereby improving the damping effect of the damping system 17; alternatively, the first vibration isolation plane 171 is located on the rear side of the center of gravity G, and the ratio of the distance L1 between the first vibration isolation plane 171 and the center of gravity G along the motor axis 103 to the length L of the vibrating body 10 along the motor axis 103 is greater than or equal to 0.1 and less than or equal to 0.3, thereby improving the damping effect of the damping system 17. The ratio of the distance L2 between the first vibration isolation plane 171 and the second vibration isolation plane 172 in the direction along the motor axis 103 to the length L of the vibrating body 10 along the motor axis 103 is greater than or equal to 0.3 and less than or equal to 0.4; alternatively, the ratio of the distance L2 between the first vibration isolation plane 171 and the second vibration isolation plane 172 in the direction along the motor axis 103 to the length L of the vibrating body 10 along the motor axis 103 is greater than or equal to 0.4 and less than or equal to 0.5; alternatively, the ratio of the distance L2 between the first vibration isolation plane 171 and the second vibration isolation plane 172 in the direction along the motor axis 103 to the length L of the vibrating body 10 along the motor axis 103 is greater than or equal to 0.5 and less than or equal to 0.7. Wherein, it should be noted that, any one range of the ratio of the distance L1 between the first vibration isolation plane 171 and the center of gravity G in the motor axis 103 to the length L of the vibrating body 10 along the motor axis 103 can be combined with any one range of the ratio of the distance L2 between the first vibration isolation plane 171 and the second vibration isolation plane 172 in the direction along the motor axis 103 to the length L of the vibrating body 10 along the motor axis 103. All such combinations enable the damping system 17 to achieve a good damping effect. It should be noted that, arranging the first vibration isolation plane 171 on the front side of the center of gravity G and the second vibration isolation plane 172 on the rear side of the center of gravity G, that is, arranging the center of gravity G between the first vibration isolation plane 171 and the second vibration isolation plane 172, can further improve the damping effect; and the difference in the distance between the first vibration isolation plane 171 and the second vibration isolation plane 172 may also affect the damping effect, and in this example, the distance between the first vibration isolation plane 171 and the second vibration isolation plane 172 is configured within a reasonable range to optimise the damping effect of the power tool 100.

In this example, in the direction along the motor axis 103, the distance between the center of gravity G and the vibration source 134 is greater than or equal to 0 and less than or equal to 0.2 L, that is, the center of gravity G is as close as possible to the vibration source 134 along the motor axis 103, so that when the first vibration isolation plane 171 is arranged close to the center of gravity G, the main vibration generated by the vibrating body 10 can be isolated. The second vibration isolation plane 172 can further isolate the remaining vibration generated by the vibrating body 10, further improving the damping effect of the damping system 17.

In some examples, the first vibration damping plane 171 is provided with two first vibration isolation blocks 173, the vibration isolation blocks 173 being provided on the head housing 111b, that is, the head housing 111b is provided with two first vibration isolation blocks 173. The two first vibration isolation blocks 173 are also respectively arranged on both sides of the mid-plane 102. The first vibration isolation block 173 has a positive stiffness of K. The direction of the positive stiffness of the first vibration isolation block 173 is D. Wherein the angle between the direction D of the positive stiffness of the first vibration isolation block 173 and the direction F of the excitation force is greater than or equal to 0 degrees and less than or equal to 60 degrees; in some examples, the angle between the direction D of the positive stiffness of the first vibration isolation block 173 and the direction F of the excitation force is greater than or equal to 0 degrees and less than or equal to 45 degrees; in some examples, the angle between the direction D of the positive stiffness of the first vibration isolation block 173 and the direction F of the excitation force is greater than or equal to 0 degrees and less than or equal to 30 degrees; in some examples, the angle between the direction D of the positive stiffness of the first vibration isolation block 173 and the direction F of the excitation force is greater than or equal to 0 degrees and less than or equal to 10 degrees. In some examples, the direction D of the positive stiffness of at least one first vibration isolation block 173 can be made parallel to the direction F of the excitation force. In some examples, at least one first vibration isolation block 173 may be arranged on the orthographic projection of the direction F of the excitation force on the first vibration isolation plane 171. In this way, the direction D of the positive stiffness of the first vibration isolation block 173 can be as close as possible to the direction F of the excitation force, so that the damping effect of the damping system 17 can be further improved.

The angle between the direction D of the positive stiffness of the first vibration isolation block 173 and the direction F of the excitation force is greater than or equal to 0 degrees and less than or equal to 15 degrees; alternatively, the angle between the direction D of the positive stiffness of the first vibration isolation block 173 and the direction F of the excitation force is greater than or equal to 15 degrees and less than or equal to 30 degrees; alternatively, the angle between the direction D of the positive stiffness of the first vibration isolation block 173 and the direction F of the excitation force is greater than or equal to 30 degrees and less than or equal to 45 degrees; alternatively, the angle between the direction D of the positive stiffness of the first vibration isolation block 173 and the direction F of the excitation force is greater than or equal to 45 degrees and less than or equal to 60 degrees.

In some examples, for the oscillating tools of this example, the first vibration isolation block 173 is arranged in a plane perpendicular to the mid-plane 102 and passing through the motor axis 103, that is, the direction D of the positive stiffness of the first vibration isolation block 173 and the left-right direction of the movement of the eccentric portion 131 are parallel to each other. In this way, the damping effect of the damping system 17 can be further improved.

In this example, the number of second vibration isolation blocks 174 on the second vibration isolation plane 172 is at least two. The orthographic projections of the multiple first vibration isolation blocks 173 on the first vibration isolation plane 171 in a plane perpendicular to the motor axis 103 and orthographic projections of the multiple second vibration isolation blocks 174 on the second vibration isolation plane 172 in a plane perpendicular to the motor axis 103 at least partially intersect. The orthographic projections of the multiple first vibration isolation blocks 173 on the first vibration isolation plane 171 in a plane perpendicular to the motor axis 103 and orthographic projections of the multiple second vibration isolation blocks 174 on the second vibration isolation plane 172 in a plane perpendicular to the motor axis 103 may also completely intersect, and the plane is also parallel to the first vibration isolation plane 171. In some examples, the orthographic projections of the multiple first vibration isolation blocks 173 on the first vibration isolation plane 171 in a plane perpendicular to the motor axis 103 and orthographic projections of the multiple second vibration isolation blocks 174 on the second vibration isolation plane 172 in a plane perpendicular to the motor axis 103 at least partially intersect in the circumferential direction around the motor axis 103. In other words, the orthographic projections of the multiple first vibration isolation blocks 173 on the first vibration isolation plane 171 in a plane perpendicular to the motor axis 103 are a plurality of first projections, the orthographic projections of the multiple second vibration isolation blocks 174 on the second vibration isolation plane 172 in a plane perpendicular to the motor axis 103 are a plurality of second projections, wherein at least some of the plurality of the first projections and at least some of the plurality of second projections sequentially intersect in the circumferential direction around the motor axis 103. In some examples, the orthographic projections of the multiple first vibration isolation blocks 173 on the first vibration isolation plane 171 in a plane perpendicular to the motor axis 103 and orthographic projections of the multiple second vibration isolation blocks 174 on the second vibration isolation plane 172 in a plane perpendicular to the motor axis 103 sequentially intersect in the circumferential direction around the motor axis 103. Thus, when the first vibration isolation block 173 on the first vibration isolation plane 171 absorbs the vibration of the vibrating body 10 in the direction F of the excitation force as much as possible, the second vibration isolation block 174 on the second vibration isolation plane 172 can absorb the vibration of the vibrating body 10 in directions other than the direction F of the excitation force as much as possible, so that the damping effect of the damping system 17 can be further improved. In some examples, the second vibration isolation block 174 is mounted to the housing of the motor 121. For the oscillating tool of this example, both the hit direction of the eccentric portion 131 on the oscillating rod 133 and the oscillation direction of the output shaft 141 are substantially parallel to the direction F of the excitation force. Both the hit direction of the eccentric portion 131 on the oscillating rod 133 and the oscillation direction of the output shaft 141 are substantially perpendicular to the motor axis 103. Therefore, arranging the first vibration isolation block 173 and the second vibration isolation block 174 in a plane perpendicular to the motor axis 103 can effectively reduce the main vibration generated from the hit of the eccentric portion 131 on the oscillating rod 133, and also reduce the minor vibration generated by the oscillation of the output shaft 141.

In this example, the number of first vibration isolation blocks 173 is two or more. The first vibration isolation blocks 173 are sequentially arranged in the circumferential direction around the motor axis 103, and in the circumferential direction, two adjacent first vibration isolation blocks 173 have a gap in between, that is, any two first vibration isolation blocks 173 are spaced apart. The number of second vibration isolation blocks 174 is two or more. The second vibration isolation blocks 174 are sequentially arranged in the circumferential direction around the motor axis 103, and in the circumferential direction, two adjacent second vibration isolation blocks 174 have a gap in between, that is, any two second vibration isolation blocks 174 are spaced apart. In this way, the vibration generated by the vibrating body 10 can be isolated in multiple directions, thereby improving the damping effect.

It should be noted that, in this example, the first vibration isolation plane 171 is provided with a plurality of spaced first vibration isolation blocks 173 to achieve the damping effect. It is understandable that, in other examples, the first vibration isolation plane 171 may also be provided with an annular vibration isolation block extending in the circumferential direction around the motor axis 103 to achieve vibration isolation. Similarly, the second vibration isolation plane 172 is provided with a plurality of spaced second vibration isolation blocks 174 to achieve the damping effect. It is understandable that, in other examples, the second vibration isolation plane 172 may also be provided an annular vibration isolation block extending in the circumferential direction around the motor axis 103 to achieve vibration isolation. Moreover, in this example, the first vibration isolation plane 171 and the second vibration isolation plane 172 are spaced apart, that is, the first vibration isolation blocks 173 and the second vibration isolation blocks 174 are spaced apart in the direction perpendicular to the first vibration isolation plane 171. Therefore, on the one hand, the vibration isolation effect can be improved using as few vibration isolation blocks as possible; on the other hand, introducing a gap between the portion of the first housing 111 between the first vibration isolation plane 171 and the second vibration isolation plane 172 and the portion of the second housing 112 between the first vibration isolation plane 171 and the second vibration isolation plane 172 can further hinder the transmission of vibration from the first housing 111 to the second housing 112. In some examples, the gap between the portion of the first housing 111 between the first vibration isolation plane 171 and the second vibration isolation plane 172 and the portion of the second housing 112 between the first vibration isolation plane 171 and the second vibration isolation plane 172 is an annular gap around the motor axis 103.

In some examples, the second vibration isolation block 174 on the second vibration isolation plane 172 is disposed on the motor housing portion 111d, that is, the second vibration isolation plane 172 passes through the motor housing portion 111d.

It is to be understood that, in the present disclosure, the vibrating body 10 further includes a third vibration isolation plane 175 perpendicular to the motor axis 103 of the motor shaft 121. The third vibration isolation plane 175 is provided with a third vibration isolation block. The third vibration isolation plane 175 is also arranged between the first vibration isolation plane 171 and the second vibration isolation plane 172.

In this example, the first vibration isolation block 173, the second vibration isolation block 174, and the third vibration isolation block are all made of polyurethane foam material, which has good elasticity and good recovery performance. The first vibration isolation block 173 or the second vibration isolation block 174 is also arranged inside the handle portion 112a, so as to further reduce the vibration transmitted to the user's hand. There is a gap between the motor housing portion 111d and the second housing 112, and the second vibration isolation block 174 is disposed in the gap.

In this example, when the power tool 100 is started under no load, a vibration acceleration can be obtained through measurement, and the value of the vibration acceleration is a meter/sec^2. When the damping effect of the power tool 100 is improved, the cutting ability of the power tool 100 can be greatly improved. Specifically, for oscillating tools, the maximum rotational speed of the motor 121 is R rpm, and the oscillating angle of the output shaft 141 is A degrees, wherein the ratio of the rotational speed R of the motor 121 to the vibration acceleration a of the power tool 100 is greater than or equal to 5000 and less than or equal to 20000. The ratio of the oscillating angle A of the output shaft 141 to the vibration acceleration a of the power tool 100 is greater than or equal to 1 and less than or equal to 3. In some examples, the ratio of the rotational speed R of the motor 121 to the vibration acceleration a of the power tool 100 is greater than or equal to 5000 and less than or equal to 6000; alternatively, the ratio of the rotational speed R of the motor 121 to the vibration acceleration a of the power tool 100 is greater than or equal to 6000 and less than or equal to 10,000; alternatively, the ratio of the rotational speed R of the motor 121 to the vibration acceleration a of the power tool 100 is greater than or equal to 10,000 and less than or equal to 20,000. The ratio of the oscillating angle A of the output shaft 141 to the vibration acceleration a of the power tool 100 is greater than or equal to 1 and less than or equal to 1.7; alternatively, the ratio of the oscillating angle A of the output shaft 141 to the vibration acceleration a of the power tool 100 is greater than or equal to 1.7 and less than or equal to 3. In this way, for the power tool 100 with a relatively large vibration amplitude, when the vibration problem of the power tool 100 is solved, the output efficiency of the power tool 100 can be further improved, so as to meet the increasing demand for low-vibration power tools 100, and promote the development of power tools 100. More specifically, with our appropriate adjustments to the structure, performance and position of the damping system 17, the rotational speed R of the motor 121 can be greater than or equal to 20000 and less than or equal to 22000, or the rotational speed R of the motor 121 can be greater than or equal to 22000; the oscillating angle A of the output shaft 141 can be greater than or equal to 3.6 and less than or equal to 5, or the oscillating angle A of the output shaft 141 can be greater than or equal to 5.

In this disclosure, the vibration of the power tool is better controlled to improve user's work efficiency.

What is claimed is:

1. A power tool, comprising:
   a power assembly comprising a motor, the motor having
      a motor shaft rotatable about a motor axis;
   an output assembly comprising an output shaft configured
      to output power;
   a transmission assembly configured to realize power
      transmission between the power assembly and the
      output assembly;
   a first housing supporting at least the power assembly, the
      transmission assembly and the output assembly; and a second housing surrounding at least part of the first housing, the second housing being further formed with a handle portion configured for a user to hold;

wherein the power tool is provided with a first vibration isolation plane and a second vibration isolation plane, the first vibration isolation plane is provided with a first vibration isolation block, the second vibration isolation plane is provided with a second vibration isolation block, a whole composed of the first vibration isolation block and the second vibration isolation block is at least provided with a spacing portion provided between the first housing and the second housing, the second housing is spaced apart from the first housing at the spacing portion, the first vibration isolation block and the second vibration isolation block are separated from each other, and at least part of the first vibration isolation block or at least part of the second vibration isolation block is arranged inside the handle portion, and wherein a structure of the power tool that generates vibration is defined as a vibrating body, the vibrating body at least comprises the power assembly, the output assembly, the transmission assembly and the first housing, the vibrating body has a center of gravity, a length of the vibrating body in a direction along the motor axis is L, the first vibration isolation plane and the motor axis are perpendicular to each other, and a distance between the first vibration isolation plane and the center of gravity of the vibrating body along the motor axis is L1, and a ratio of the distance L1 between the first vibration isolation plane and the center of gravity of the vibrating body in the motor axis to the length L of the vibrating body in the motor axis is greater than or equal to 0 and less than or equal to 0.3.

2. The power tool of claim 1, wherein the second vibration isolation plane and the motor axis are perpendicular to each other, a distance between the first vibration isolation plane and the second vibration isolation plane is L2, a ratio of the distance L2 between the first vibration isolation plane and the second vibration isolation plane to the length L of the vibrating body along the motor axis is greater than or equal to 0.3 and less than or equal to 0.7.

3. The power tool of claim 1, wherein the center of gravity of the vibrating body is arranged between the first vibration isolation plane and the second vibration isolation plane.

4. The power tool of claim 1, wherein the vibrating body further defines a third vibration isolation plane perpendicular to the motor axis, a third vibration isolation block is provided on the third vibration isolation plane, and the third vibration isolation plane is arranged between the first vibration isolation plane and the second vibration isolation plane.

5. The power tool of claim 1, wherein the first vibration isolation plane and the second vibration isolation plane are parallel to each other, and the first vibration isolation block and the second vibration isolation block are spaced apart from each other in a direction perpendicular to the first vibration isolation plane.

6. The power tool of claim 1, wherein the first housing is symmetrical about a mid-plane, the number of the first vibration isolation blocks is at least two, and the first vibration isolation blocks are symmetrically distributed on both sides of the mid-plane.

7. The power tool of claim 1, wherein the first vibration isolation plane and the second vibration isolation plane are parallel to each other and an orthographic projection of the second vibration isolation block of the second vibration isolation plane on a plane parallel to the first vibration isolation plane and an orthographic projection of the first vibration isolation block of the first vibration isolation plane on that plane at least partially intersect.

8. The power tool of claim 1, wherein the output shaft is capable of oscillating about an output shaft axis within an oscillating angle A and the oscillating angle A of the output shaft is greater than or equal to 3.6 and less than or equal to 5.

9. The power tool of claim 1, wherein the motor has a maximum rotational speed of R rpm and the maximum rotational speed R of the motor is greater than or equal to 20,000 and less than or equal to 22,000.

10. The power tool of claim 1, wherein the number of the first vibration isolation blocks is at least two, the first vibration isolation blocks are sequentially arranged in a circumferential direction around the motor axis, and, in the circumferential direction, two adjacent first vibration isolation blocks have a gap in between.

11. The power tool of claim 1, wherein the output shaft is capable of oscillating about an output shaft axis within an oscillating angle A, the transmission assembly comprises a hit portion and an oscillating rod enabled to be hit by the hit portion in a direction F of an excitation force, and a direction D of a positive stiffness of at least one first vibration isolation block and the direction F of the excitation force form an angle greater than or equal to 0 degrees and less than or equal to 60 degrees.

12. The power tool of claim 11, wherein the direction D of the positive stiffness of at least one first vibration isolation block is parallel to the direction F of the excitation force.

* * * * *